Aug. 9, 1932.     J. G. BLUNT     1,871,028
LOCOMOTIVE
Filed April 9, 1926     2 Sheets-Sheet 1
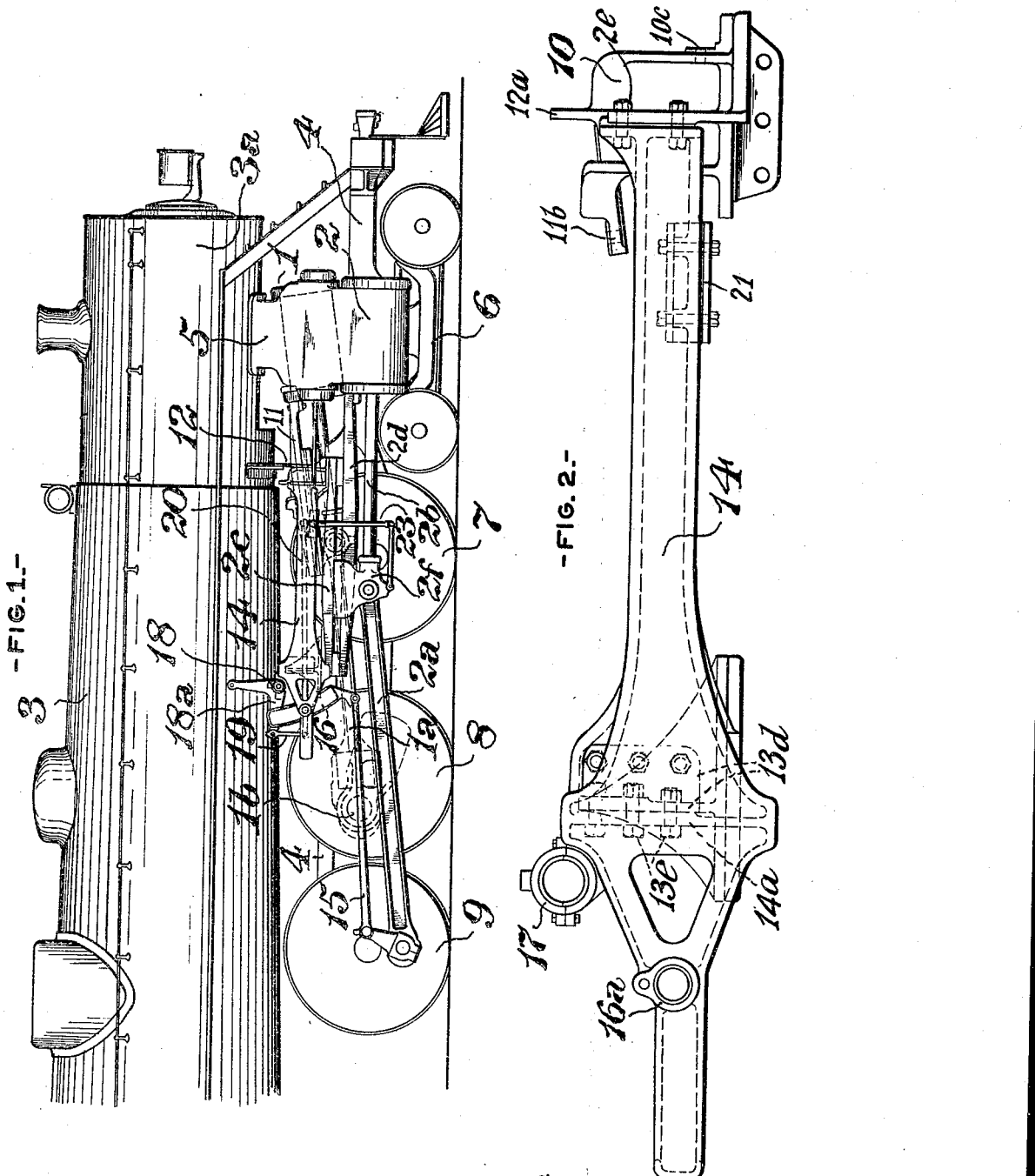
WITNESSES
A. S. Vanderbilt
S. R. Bell
INVENTOR
James G. Blunt

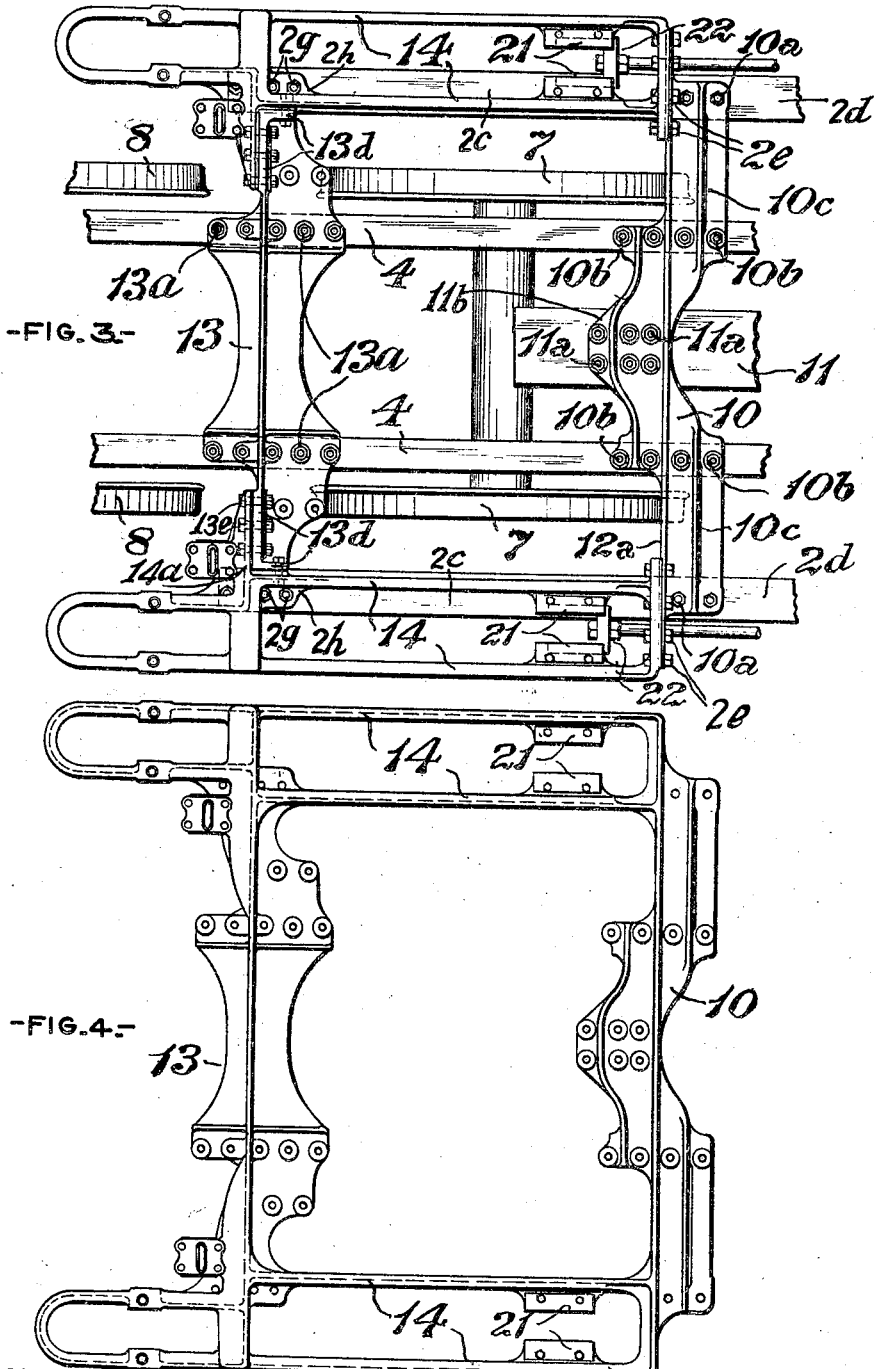

Patented Aug. 9, 1932

1,871,028

UNITED STATES PATENT OFFICE

JAMES G. BLUNT, OF SCHENECTADY, NEW YORK

LOCOMOTIVE

Application filed April 9, 1926. Serial No. 100,832.

My invention relates to steam locomotives, and more particularly to those of the three cylinder type, although not limited thereto, being similarly applicable, and with correspondingly advantageous results, in those of other types. The objects of the invention are to effect an improvement in the frame bracing, whereby greater strength, and rigidity are imparted to the structure; and to provide a supporting unit, either integral or built up, in which many parts of the valve gear may be assembled and applied in position, before the unit is incorporated in the locomotive structure, and which will combine the functions of several diversified structural elements, which have been heretofore individually applied for the support of members of the locomotive machinery.

The improvement claimed is hereinafter fully set forth.

In the accompanying drawings: Figure 1 is a diagrammatic side view, in elevation, of a portion of a locomotive, illustrating an embodiment of my invention; Fig. 2, a view, in side elevation, and on an enlarged scale, of the frame cross tie and machinery support unit thereof; Fig. 3, a plan or top view of the same, in a built up structure; and, Fig. 4, a similar view of the same, in an integral construction.

In the practice of my invention, referring descriptively to the specific embodiment thereof which is herein exemplified in a three cylinder locomotive having a four wheeled leading truck and a plurality of driving wheels, (six being shown), I provide a frame cross tie and machinery support, which is substantially of the construction, and relation to other constituents of the locomotive which will now be, in detail, set forth.

The smoke box, 3a, of the boiler, 3, of the locomotive, is supported on, and connected, in the usual manner, to the frame members, 4, by a cylinder saddle, 5, in which there are cored a third or middle cylinder, 1, and side cylinders, 2, on opposite sides thereof. The forward ends of the frame members are supported on a four wheeled truck 6, and, in rear thereof there are journalled in the frame the axles of a front pair of driving wheels, 7, a second pair, 8, and a third pair, 9. The axles of a plurality of other driving wheels (not shown) are similarly journalled in the frame to the rear of the driving wheels 9. The pistons of the side cylinders, 2, are coupled, by main connecting rods, 2a, to crank pins on the rear pair of driving wheels, 9, and the piston of the middle cylinder, 1, is coupled by a main connecting rod, 1a, to the crank pin, 1b, of a crank on the axle of the second pair of driving wheels 8.

In order to avoid the objections of excessive length of the main connecting rods, 2a, which rotate the rear pair of driving wheels, 9, the piston rods, 2b, of the side cylinders, 2, are lengthened, thereby locating the upper and lower guide bars, 2c, 2d, of said piston rods, further rearwardly than in ordinary practice. In such practice, both the upper and the lower guide bars are connected to the rear heads of the cylinders, 2, but, in accordance with my present invention, only the lower guide bars, 2d, extend forwardly to connections with the cylinder heads, and the front ends of the upper guide bars, 2c, are located in rear thereof, at points proper to allow clearance for the cross heads, 2f, in their extreme forward positions. To provide suitable means for connecting the upper guide bars to the lower ones, and to tie the guide bars to the frame members, a transverse beam, 10, ordinarily termed a guide yoke, but also forming a frame cross brace, is applied. Guide bolts, 10a, passing through the yoke, and the upper and lower guide bars, secure them together, and frame bolts, 10b, connect the yoke to the frame members, 4. Both the front and rear ends of the guide bars are spaced by blocks of the usual construction. Bolts 2g passing through the guide bars and the block and through horizontal flanges 2h formed on the bridge members 14 secure the rear ends of the guide bars thereto. The yoke, 10, is also utilized to support the middle guide, 11, by bolts, 11a, the yoke having a flange, 11b, deflected to correspond with the inclination of the middle guide. This guide is of the usual construction, its upper member being secured, at its forward end, to a bracket on the middle cylinder head. A further function of the guide yoke, 10, is to form the lower connection with waist sheets, 12, which extend between the yoke and the boiler, on the opposite sides thereof, and, for this purpose, bolting lugs, 10c, are formed on a vertical rib provided on each end of the yoke. Bolts passing horizontally through the lugs, 10c, and the waist sheets, 12, secure the parts together. The upper ends of the waist sheets, 12, are connected to the shell of the boiler by the usual angle irons. In order to brace the frame members and support the outside guide bars, at the rear ends of the outside guide bars, another cross member, 13, is provided at this point, and is secured to the frame members by bolts, 13a.

Bolting flanges 12a and 13d are formed on the yoke, 10, and cross member, 13, respectively, for the attachment of double parallel girder bridge members, 14, which are located outside of the wheels, and extend from the yoke, 10, to the cross member, 13, a rectangular structure being thereby formed, which performs the functions of both a frame brace and a machinery support. In the ordinary practice of some designs in which a Walschaert valve gear is applied, a bridge member is utilized as a link support, where the axis of the link is close to the vertical central plane of one of the pairs of driving wheels, but in my present invention, in which members of the machinery are moved rearwardly, as before described, and in order to overcome the vibration resultant upon the application of extremely long eccentric rods, 15, the link supports comprise longitudinal extensions of the parallel girder bridge members, 14, which extend rearwardly, beyond the rear anchors of the bridge members, 14, and provide loops to which the links, 16, are journalled in trunnion bearings, 16a. The connection of the bridge members, 14, to the rear cross member, 13, is effected through bolting flanges 13d, on the transverse member, 13, connected by bolts, 13e, to the inwardly extending bolting flanges, 14a, formed adjacent to the ends of the bridge members, 14.

The reverse shaft bearings, 17, are carried by the inwardly projecting flanges, 14a, and form end supports for the transversely extending reverse shaft, 18, and the lifting arms, 18a, at its ends, to which the radius bar lifters, 19, are connected. Correct lateral position of the bridge members, 14, is provided by the bolting connection effected between the interior faces of the members, 14, which bear against the flanges, 13d, of the cross member, 13. The front ends of the bridge members, 14, are connected, through their front walls, to the ends of the front yoke vertical flange, 12a, by bolts 2e, and the structure or auxiliary frame, comprising the front yoke, 10, the rear cross member, 13, and the two side bridge members, 14, forms a rectangle which is of extreme rigidity to withstand the alternate lateral stresses and the vibration imposed by the valve gear.

Consistently with the increased rearward location of members of the machinery, as compared with ordinary practice, and to prevent excessive length of the radius bars, 20, my present invention differs from such practice as to the location of the valve stem cross head guides. Prior to my invention, said guides have almost invariably been attached to, or made a part of, the rear steam chest cover, and have acted in connection with short valve stems. In the practice of my invention, the valve stems are lengthened, similarly to the piston rods, and the valve stem cross head guides, 21, are formed on the inside of the side girder bridge members, 14. By applying, in the rectangular structure, formed by the yoke, 10, cross member, 13, and the two side girder bridge members, 14, 14, the valve stem cross heads, 22, radius bars, 20, the links, 16, and combination levers, 23, to the bridge members, 14, and reverse shaft, 18, with its lifting arms, 18a, together with the radius bar lifters, 19, to the rear cross member, 13, or more strictly, as to Fig. 3, to the inwardly projecting bolting flanges, 14a, formed on the bridge members, 14, a majority of the valve gear members may be assembled in the rectangular structure before attaching it to the locomotive frame. It is also possible to attach the guide bars, 2c, 2d, of the crossheads of the outside cylinder piston rods, to the rectangular structure, since the front ends of said guide bars are connected to the under sides of the yoke 10, by bolts, 10a, the members of the rectangular structure having been previously bolted together. To attach the structure to the locomotive, it is only necessary to drive and secure the frame bolts, attach the middle guide, 11, by bolts, 11a, and apply the waist sheets, 12.

A structural modification of the bracing and supporting structure above described, is shown in Fig. 4, which illustrates the members thereof as integrally combined. The purposes and extent of the built up and the integral constructions are identical, and the supports for the valve gear members, guides, and attachment means to the locomotive frame are of similar form and respective location, the only difference being in the elimination, in the integral structure, of the individual bolting connecting flanges. At their forward ends, in the latter structure, the girder bridge members, 14, are joined directly to front transverse member, 10, and similarly, at the rear, they are joined to rear transverse member, 13.

It will be obvious to those familiar with the art of locomotive building and operation that my invention, substantially as herein set forth, presents the following substantially advantages. The location of the mechanism further towards the rear than in prior practice, renders applicable shorter main connecting rods and valve gear rods, correspondingly overcoming bending under load and compression, and preventing vibration and the quadrangular bracing and supporting structure which is provided, is of extreme rigidity to oppose the alternate fore and aft thrusts of the valve gear, and affords a support for the majority of the valve gear members and the outside guides, which may thus be readily assembled before application to the locomotive.

I claim as my invention and desire to secure by Letters Patent:

1. A combined frame brace and machinery support for locomotives, comprising a rear transverse member; a front transverse member, the said members each having means for attachment to the side frames of a locomotive, and means for supporting one end of a piston rod cross head guide; and longitudinal members connecting the transverse members, and having rearward extensions forming a loop, the branches of which providing a bearing for a valve motion link.

2. A combined frame brace and machinery support for locomotives, comprising a rear transverse member; a front transverse member, the said members each having means for attachment to the side frames of a locomotive, and means for supporting one end of a piston rod cross head guide; and longitudinal members connecting the transverse members and having means for supporting a valve stem cross head guide, and rearward extensions forming a loop, the branches of which providing a bearing for a valve motion link.

3. A combined frame brace and machinery support for locomotives, comprising a rear transverse member; a front transverse member, the said members each having means for attachment to the side frames of a locomotive, and means for supporting one end of a piston rod cross head guide; and two pairs of longitudinal members connecting the transverse members, one pair being disposed at each end of the transverse members, each pair having means for supporting a valve stem cross head guide, and rearward extensions forming a loop, the branches of which providing a bearing for a valve motion link.

4. A combined frame brace and machinery support for locomotives, comprising a rear transverse member; a front transverse member, the said members each having means for attachment to the side frames of a locomotive, and means for supporting one end of a piston rod cross head guide; and two pairs of longitudinal members connecting the transverse members, one pair being disposed at each end of the transverse members, said longitudinal members having rearward extensions forming a loop, the branches of which providing a bearing for a valve motion link.

5. In a locomotive, the combination of a pair of side frames; a machinery supporting structure comprising transverse members secured to the side frames and bracing the same, and longitudinal members secured to and bracing the transverse members in their spaced relation; a piston rod; a cross head for the piston rod; a connecting rod connected to the cross head; a guide for the piston rod cross head supported at its front end by a transverse member of the machinery supporting structure; a distribution valve rod; a cross head for the valve rod; a guide for the valve rod cross head formed on a longitudinal member of the machinery supporting structure; and a valve motion member supported by a longitudinal member of the machinery supporting structure.

6. In a locomotive, the combination of a pair of side frames; a machinery supporting structure comprising transverse members secured to the side frames and bracing the same, and longitudinal members secured to and bracing the transverse members in their spaced relation; a piston rod; a cross head for the piston rod; a connecting rod connected to the cross head; a guide for the piston rod cross head supported at its front end by a transverse member of the machinery supporting structure; a distribution valve rod; a cross head for the valve rod; a guide for the valve rod cross head formed on a longitudinal member of the machinery supporting structure; and a valve motion member disposed rearwardly of the piston rod cross head guide and supported by a longitudinal member of the machinery supporting structure.

7. In a locomotive, the combination of a pair of side frames; a machinery supporting structure comprising transverse members secured to the side frames and bracing the same, and longitudinal members secured to and bracing the transverse members in their spaced relation; a piston rod; a cross head for the piston rod; a connecting rod connected to the cross head; a guide for the piston rod cross head supported at its front and rear ends by the transverse members of the machinery supporting structure; a distribution valve rod; a cross head for the valve rod; a guide for the valve rod cross head formed on a longitudinal member of the machinery supporting structure; and a valve motion member disposed rearwardly of the piston rod cross head guide and supported by a longitudinal member of the machinery supporting structure.

8. In a locomotive, the combination of a pair of side frames; a machinery supporting structure comprising transverse members secured to the side frames and bracing the same, and longitudinal members secured to and bracing the transverse members in their spaced relation; a piston rod; a cross head for the piston rod; a connecting rod connected to the cross head; a guide for the piston rod cross head supported at its front and rear ends by the transverse members of the machinery supporting structure; a distribution valve rod; a cross head for the valve rod; a guide for the valve rod cross head formed on a longitudinal member of the machinery supporting structure; and a valve motion member supported by a longitudinal member of said machinery supporting structure.

9. In a locomotive, the combination of a plurality of pairs of driving wheels; axles therefor; a main frame supported on the axles; a working side cylinder carried on the frame beyond said driving wheels; a distribution valve chest adjacent said cylinder; a piston disposed in the cylinder; a piston rod secured to the piston and projecting therefrom towards the driving wheels; a valve in said valve chest; a valve rod secured to the valve and projecting therefrom in the direction of the driving wheels; an auxiliary frame secured to the main frame and disposed substantially adjacent the pair of driving wheels nearest the cylinder; a cross head connected to the piston rod; a cross head connected to the valve rod; a guide for said piston rod cross head providing a guideway having its forward end spaced rearward of the cylinder; means, independent of the cylinder, securing the piston rod cross head guide to the auxiliary frame at the forward part of the guideway; a guide for said valve rod cross head; means securing the valve rod cross head guide to the auxiliary frame separately from and independently of the valve chest; a connecting rod connected at one end to the piston rod cross head and at the other end to a driving wheel of a pair beyond the pair adjacent the auxiliary frame; and mechanism connecting the valve rod cross head to the said driving wheel to which the said connecting rod is connected.

10. In a locomotive, the combination of a plurality of driving wheels; axles therefor; a main frame supported on the axles; a working side cylinder and a distribution valve chest therefor carried on the frame beyond the driving wheels; a piston disposed in the cylinder; a piston rod secured to the piston, a valve rod for said valve chest; said rods extending in the direction of the driving wheels; an auxiliary frame secured to the main frame and disposed substantially adjacent the pair of driving wheels nearest the said cylinder and chest; a cross head connected to the piston rod; a cross head secured to the valve rod; a guide for said piston rod cross head; a guide for said valve rod cross head, said piston rod cross head guide being secured at both its forward and rear ends to said auxiliary frame and said valve rod cross head guide being independent of and separate from the valve chest, and secured to the auxiliary frame; a connecting rod connected to the piston rod cross head at one end and at the other end to the driving wheel of a pair beyond the pair adjacent the auxiliary frame; and mechanism connecting the valve rod cross head to the said driving wheel to which the said connecting rod is connected.

11. A locomotive comprising a combined frame brace and machinery support, having a rear transverse member; a front transverse member, said members having means for attachment to the side frame members of the locomotive, and the said transverse members extending laterally beyond at least one of said side frame members; a working cylinder crosshead guide, providing a guideway, and connected at both ends of the guideway with the said lateral extension; and a distribution valve crosshead guide connected with said lateral extensions above said guideway.

JAMES G. BLUNT.